United States Patent
Litovtchenko et al.

(10) Patent No.: US 10,467,889 B2
(45) Date of Patent: Nov. 5, 2019

(54) ALARM HANDLING CIRCUITRY AND METHOD OF HANDLING AN ALARM

(71) Applicant: Infineon Technologies AG, Neubiberg (DE)

(72) Inventors: Vladimir Litovtchenko, Ebersberg (DE); Avni Bildhaiya, Deisenhofen (DE); Abdoul Aziz Kane, Munich (DE); Longli Yu, Taufkirchen (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/886,869

(22) Filed: Feb. 2, 2018

(65) Prior Publication Data

US 2018/0233026 A1     Aug. 16, 2018

(30) Foreign Application Priority Data

Feb. 16, 2017  (DE) .................... 10 2017 103 147

(51) Int. Cl.
*G08B 29/04*     (2006.01)
*G05B 19/048*    (2006.01)
(Continued)

(52) U.S. Cl.
CPC ........... *G08B 29/04* (2013.01); *G05B 19/048* (2013.01); *G05B 19/0428* (2013.01);
(Continued)

(58) Field of Classification Search
USPC ...................................... 340/287, 506, 540
See application file for complete search history.

(56) References Cited

U.S. PATENT DOCUMENTS

| 4,443,784 A | 4/1984 | Franzen et al. |
| 4,740,887 A | 4/1988 | Rutenberg |

(Continued)

FOREIGN PATENT DOCUMENTS

| CN | 106557083 A | 4/2017 |
| DE | 102015203253 A1 | 8/2016 |

(Continued)

OTHER PUBLICATIONS

Office Action issued in the Japanese Patent Application No. 2018-023933 dated Feb. 12, 2019, 5 pages (Reference Purpose Only).

(Continued)

*Primary Examiner* — Leon Viet Q Nguyen
(74) *Attorney, Agent, or Firm* — Viering, Jentschura & Partner MBB

(57) ABSTRACT

In various embodiments, an alarm handling circuitry is provided. The alarm handling circuitry may include a first alarm processing circuit configured to process a first received alarm and to provide a first processed alarm response signal, a second alarm processing circuit configured to process a second received alarm and to provide a second processed alarm response signal, and an interface between the first alarm processing circuit and the second alarm processing circuit configured to input an alive indication signal from the first alarm processing circuit to the second alarm processing circuit indicating whether the first alarm processing circuit is operating.

20 Claims, 12 Drawing Sheets

(51) Int. Cl.
  *G05B 23/02* (2006.01)
  *G05B 19/042* (2006.01)
  *G08B 23/00* (2006.01)
(52) U.S. Cl.
  CPC .... *G05B 23/02* (2013.01); *G05B 2219/25158* (2013.01); *G08B 23/00* (2013.01)

(56) References Cited

U.S. PATENT DOCUMENTS

| | | | |
|---|---|---|---|
| 5,927,251 | A | 7/1999 | Watanabe et al. |
| 6,125,322 | A | 9/2000 | Bischof et al. |
| 2006/0150002 | A1 | 7/2006 | Yoshida |
| 2008/0010546 | A1 | 1/2008 | Fukuma et al. |
| 2009/0198407 | A1 | 8/2009 | Sakai et al. |
| 2010/0207759 | A1* | 8/2010 | Sloan ................. H05B 37/0227 340/540 |
| 2013/0222130 | A1* | 8/2013 | Cooper ................. G08B 29/06 340/501 |
| 2013/0278421 | A1* | 10/2013 | Sutton ..................... G08B 1/08 340/540 |

FOREIGN PATENT DOCUMENTS

| | | |
|---|---|---|
| JP | S60-022202 A | 2/1985 |
| JP | S61-502083 A | 9/1986 |
| JP | S64-057316 A | 3/1989 |
| JP | H03-286340 A | 12/1991 |
| JP | H06-131208 A | 5/1994 |
| JP | H10-297395 A | 11/1998 |
| JP | H11141383 A | 5/1999 |
| JP | H11505587 A | 5/1999 |
| JP | 2001-100837 A | 4/2001 |
| JP | 2006-172389 A | 6/2006 |
| JP | 2007-328403 A | 12/2007 |
| JP | 2009-184423 A | 8/2009 |
| JP | 2010026580 A | 2/2010 |
| JP | 2016-032989 A | 3/2016 |
| JP | 2016130511 A | 7/2016 |

OTHER PUBLICATIONS

Japanese Search Report based on Application No. JP2018023933A (22 pages) dated Jan. 16, 2019 (for reference purpose only).

* cited by examiner

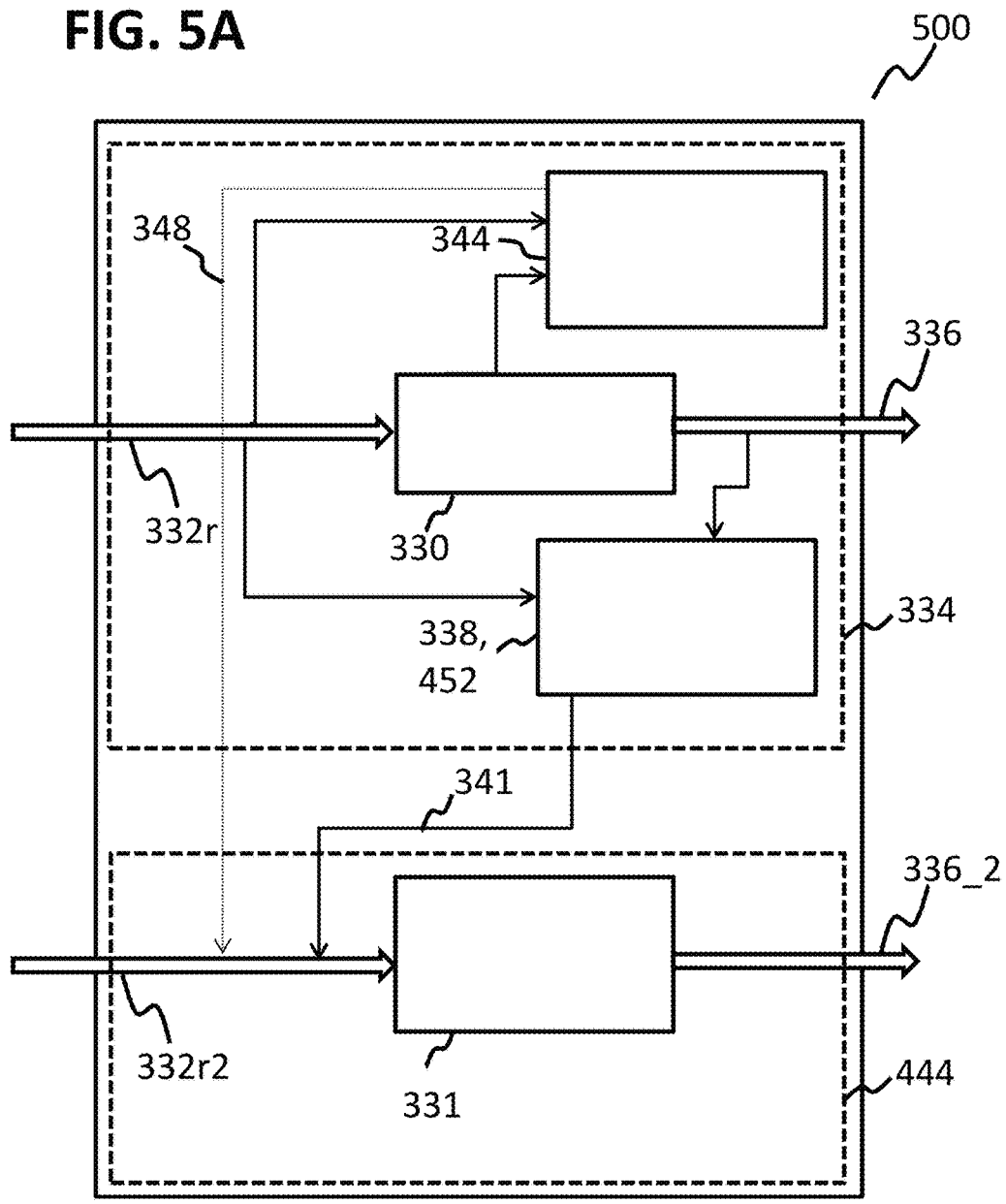

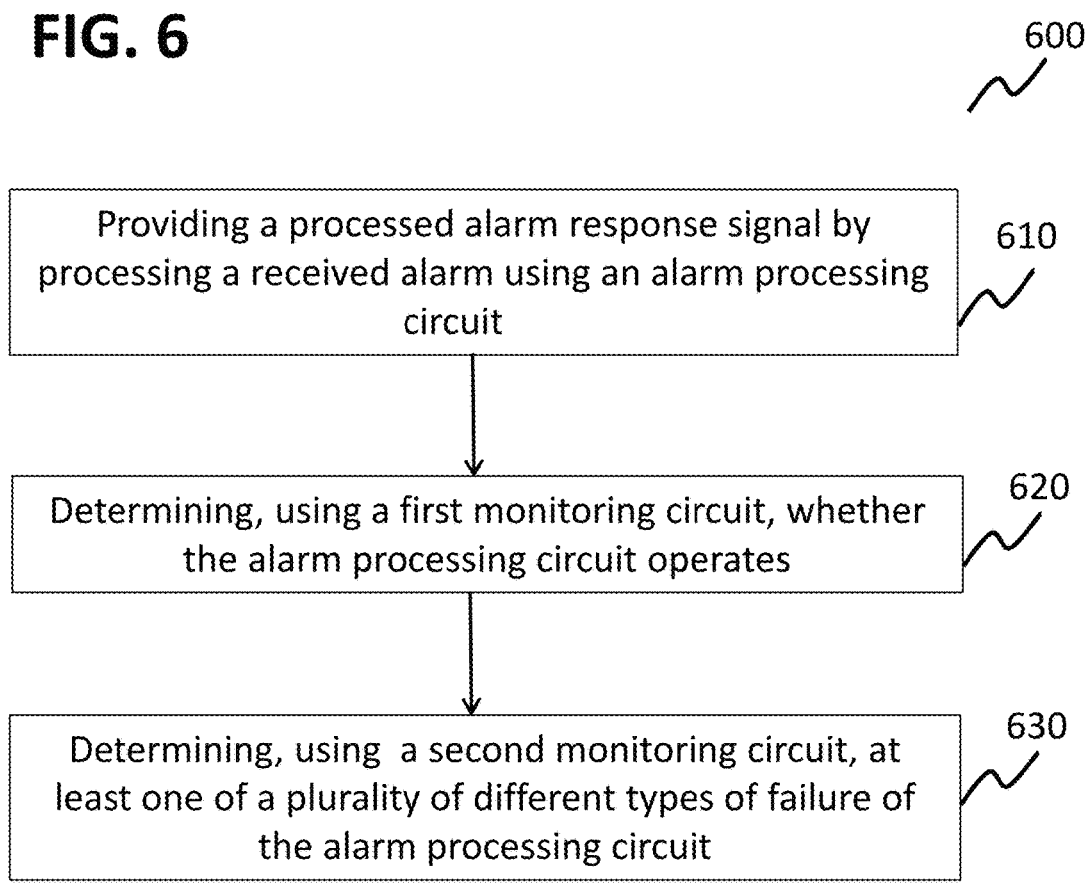

ALARM HANDLING CIRCUITRY AND METHOD OF HANDLING AN ALARM

CROSS-REFERENCE TO RELATED APPLICATION

This application claims priority to German Patent Application Serial No. 10 2017 103 147.2, which was filed Feb. 16, 2017, and is incorporated herein by reference in its entirety.

TECHNICAL FIELD

Various embodiments relate generally to an alarm handling circuitry and to a method of handling an alarm, wherein the alarm may be a reporting of a malfunction by a safety mechanism.

BACKGROUND

In various systems using electronic devices, like e.g. vehicles, a failure of the electronic system may lead to a dangerous situation. Such a failure must therefore be detected and handled appropriately for avoiding the dangerous situation. Functional Safety standard ISO26262 defines possible failure modes, requirements on detection of those as well as implementation hints for safety mechanisms (SMs). Very often, it is recommended to use either monitoring safety mechanisms or a hardware redundancy approach. ISO26262 only provides suggestions on implementation of those SMs, but real realization may highly depend on requirements, for example as applied to semiconductor motor control units (MCUs), e.g. a power consumption, a utilized die size area and a development/verification effort.

SUMMARY

In various embodiments, an alarm handling circuitry is provided. The alarm handling circuitry may include a first alarm processing circuit configured to process a first received alarm and to provide a first processed alarm response signal, a second alarm processing circuit configured to process a second received alarm and to provide a second processed alarm response signal, and an interface between the first alarm processing circuit and the second alarm processing circuit configured to input an alive indication signal from the first alarm processing circuit to the second alarm processing circuit indicating whether the first alarm processing circuit is operating.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 5A and 5B each show a block diagram of an alarm handling circuitry in accordance with various embodiments;

FIG. 6 shows a process flow of a method of handling an alarm in accordance with various embodiments.

DESCRIPTION

Figure 1:
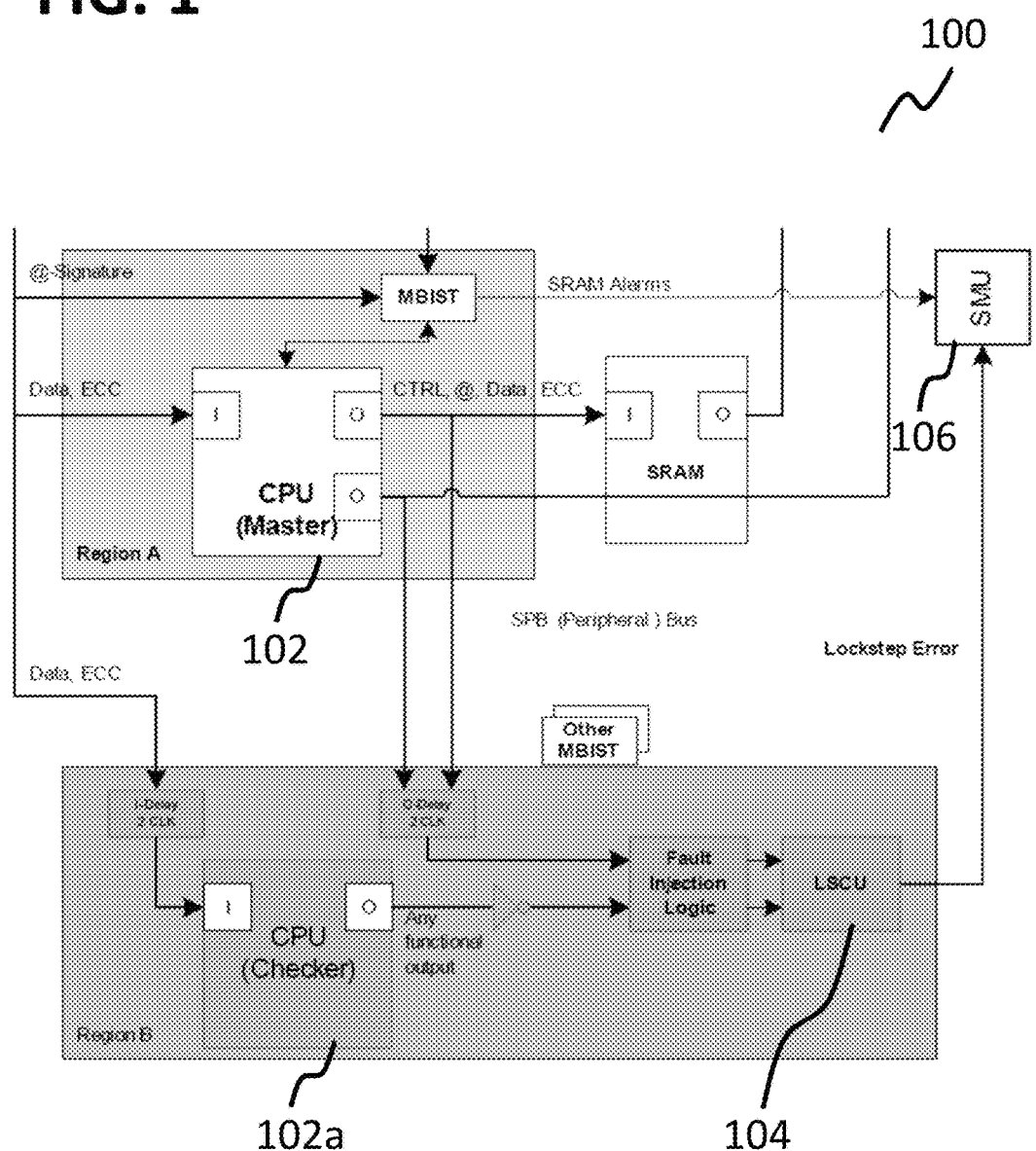
FIG. 1 shows a block diagram of a safety mechanism using a hardware redundancy setup with a lockstep mode.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

A common implementation for respecting safety related criteria/requirements may be a safety mechanism (SM) based on hardware redundancy, which may for example be configured to operate in a lockstep mode. As an example, in FIG. 1, a diagram visualizing a safety mechanism 100 using the hardware redundancy setup with the lockstep mode for a central processing unit (CPU) 102 is shown. The safety mechanism may include two CPUs 102, 102a (which are also referred to as master CPU 102 and checker CPU 102a) that may operate in lockstep mode, in other words, the two CPUs 102, 102a may perform the same functions simultaneously or with a time delay (e.g. an input delay labelled as I-Delay and/or an output delay labelled as O-Delay), and the outputs of both CPUs 102, 102a may be compared by a lockstep compare unit (LSCU) 104. A comparison result, e.g. a lockstep error, which may be recognized from a mismatch between the outputs from the master CPU 102 and the checker CUP 102a, may be provided to a safety management unit 106, which may be configured to react appropriately to the lockstep error, e.g. by raising an alarm, performing a system reset, or the like. The master CPU 102 and the checker CPU 102a may be located in different regions (e.g. "Region A" may have the master CPU 102, and "Region B" may have the checker CPU 102a). The hardware redundant safety mechanism 100 may further be provided by additional safety mechanisms, e.g. by providing data to be processed by the CPUs 102, 102a with an error correction capability, e.g. by adding an error correcting code ECC, and/or by providing at least the master CPU 102 with an memory built-in self test (labelled as MBIST), and possibly also the checker CPU 102a (labelled as "Other MBIST").

The safety mechanism 100 based on the hardware redundancy may have various advantages, e.g. that it may allow to check a main functionality, i.e. a functionality of the main system, e.g. the master CPU 102, with the redundant one (the checker CPU 102a), and so to detect failures in the main circuit. Several types of random failures may be covered by the hardware redundancy based safety mechanism 100.

However, the completely redundant hardware setup of the safety mechanism 100 may have a high impact on a die size, in other words the safety mechanism 100 may require a noticeable area on a chip. Furthermore, the safety mechanism 100 may take a significant current, which may cause a high impact on power consumption. Furthermore, the safety mechanism 100 may require a large development effort, e.g. a large design and verification effort. And yet furthermore, the safety mechanism may have a high impact on chip backend implementation, since it may require a separated and isolated placement of the two redundant parts, e.g. of the master CPU 102 and of the checker CPU 102a.

Figure 2:
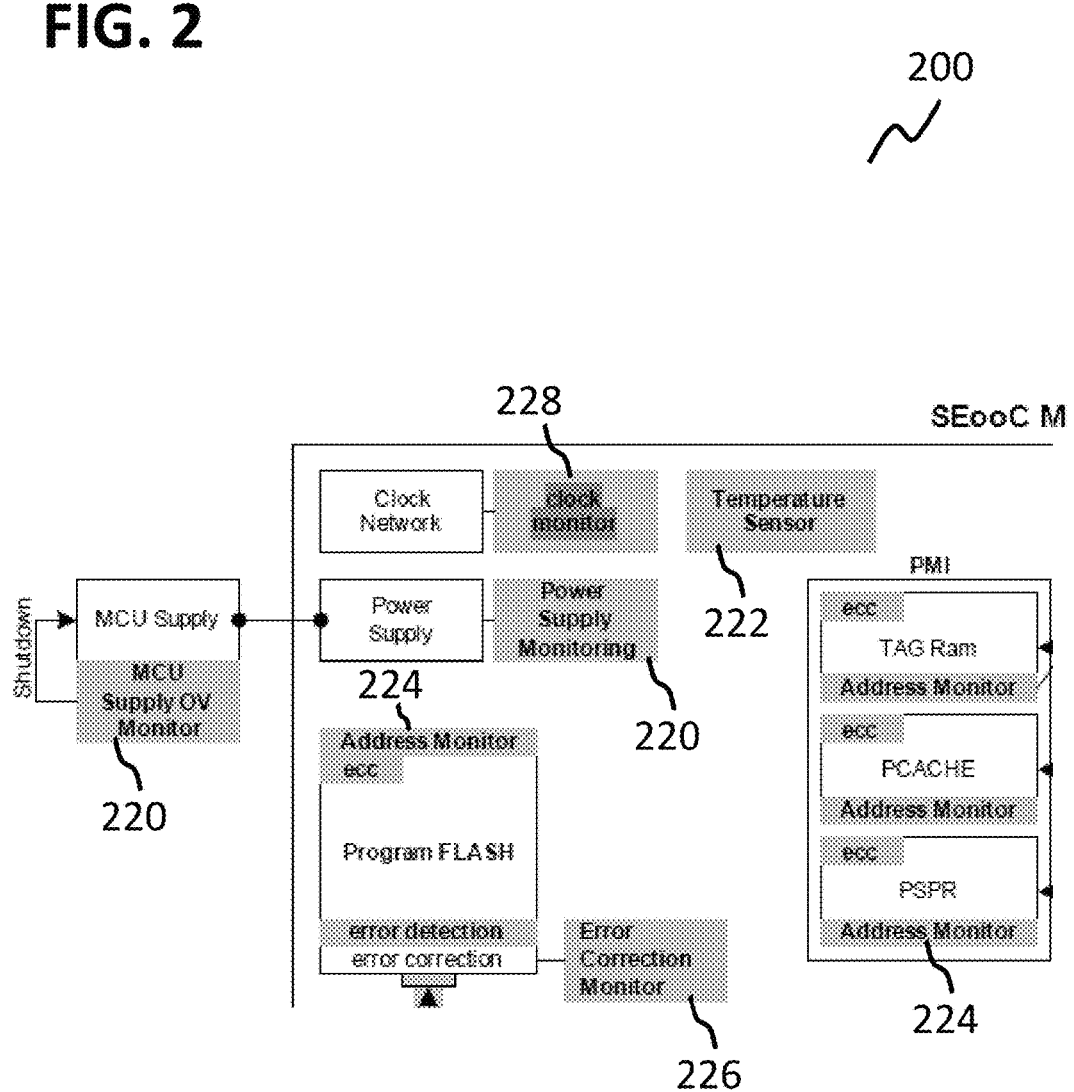
FIG. 2 shows a block diagram of a safety mechanism using a software monitoring setup.

A common alternative implementation for respecting safety related criteria/requirements may be a safety mechanism based on a monitoring principle, which may use a software-based monitoring SM, where one or more monitor/s may check monitored block's properties to be in defined limits and may request an action or may send an alarm signal in case the properties are going out of range. As shown in FIG. 2, which shows an exemplary software-based safety mechanism 200. In the software-based safety mechanism 200, examples of the monitor/s may include one or more power supply (voltage) monitor/s 220, e.g. configured to monitor a power supply and/or a motor control unit (MCU) supply, a temperature monitor 222, performance monitors, one or more address monitors 224, e.g. configured to monitor an address of a program FLASH etc., an error correction monitor 226, e.g. configured to monitor an error detection/correction performed on data in the program FLASH, a clock monitor 228, e.g. configured to monitor a clock network, and the like. The monitors may be widely used by semiconductor companies in their devices addressing functional safety requirements according to ISO26262 standard.

The safety mechanism 200 based on the software monitoring may have various advantages, e.g. that it may require a small chip area and may thus have a low impact on a die size. Furthermore, the safety mechanism 200 may have a small power consumption contribution, and may require a smaller design/verification effort than the hardware redundant safety mechanism 100.

However, the software monitoring safety mechanism 200 may be considered as not actually checking functionality, but rather only values/properties exceeding defined limits. Furthermore, failures may not be detected at source, but instead, only effects of the failures may be detected, which may lead to a slow reaction to the failures.

In various embodiments, a safety mechanism may be provided that combines properties of safety mechanisms with hardware redundancy with the advantages of the software-based monitoring SMs.

In various embodiments, an SM for functional safety is provided that may be based on a hybrid approach that may allow a combining of advantages of SMs based on hardware redundancy and monitoring SMs.

In various embodiments, a so-called "alive monitor" is provided that may be based on a high-level model of a monitored function, and which may be configured to monitor if a circuit functions correctly and may be configured to generate an alarm signal on detected mismatches/failures.

In various embodiments, a solution may be provided to the above described problems that may allow creating a monitoring module that may have properties and advantages of both prior art solutions, the safety mechanisms based on hardware redundancy and on monitoring, respectively.

In various embodiments, an implementation of advanced monitors is provided that can be easily utilized at a system level. This may be done by enabling the monitor during a functional mode of a motor control unit (MCU) and so to decrease an MCU FIT rate to reach an automotive safety integrity level defined for an application.

Figure 3A:
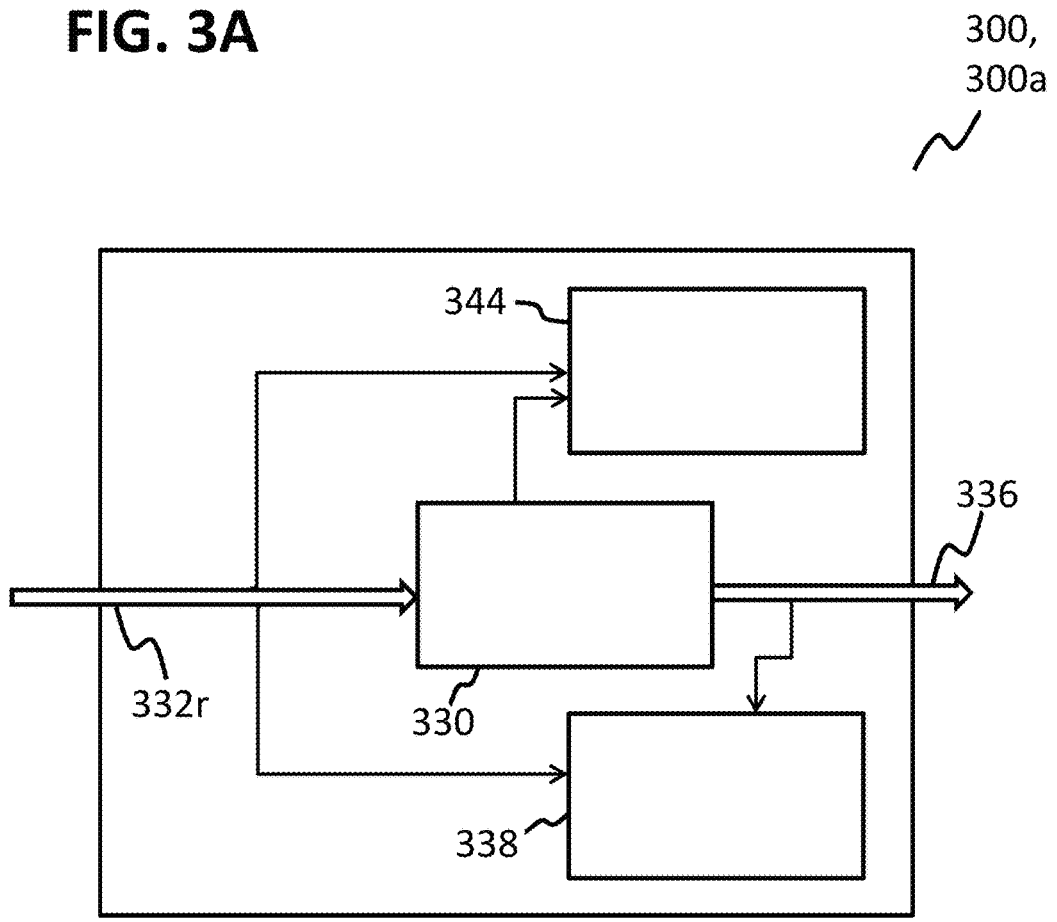
FIGS. 3A, 3B and 3C each show a block diagram of an alarm handling circuitry in accordance with various embodiments.
Figure 3B:
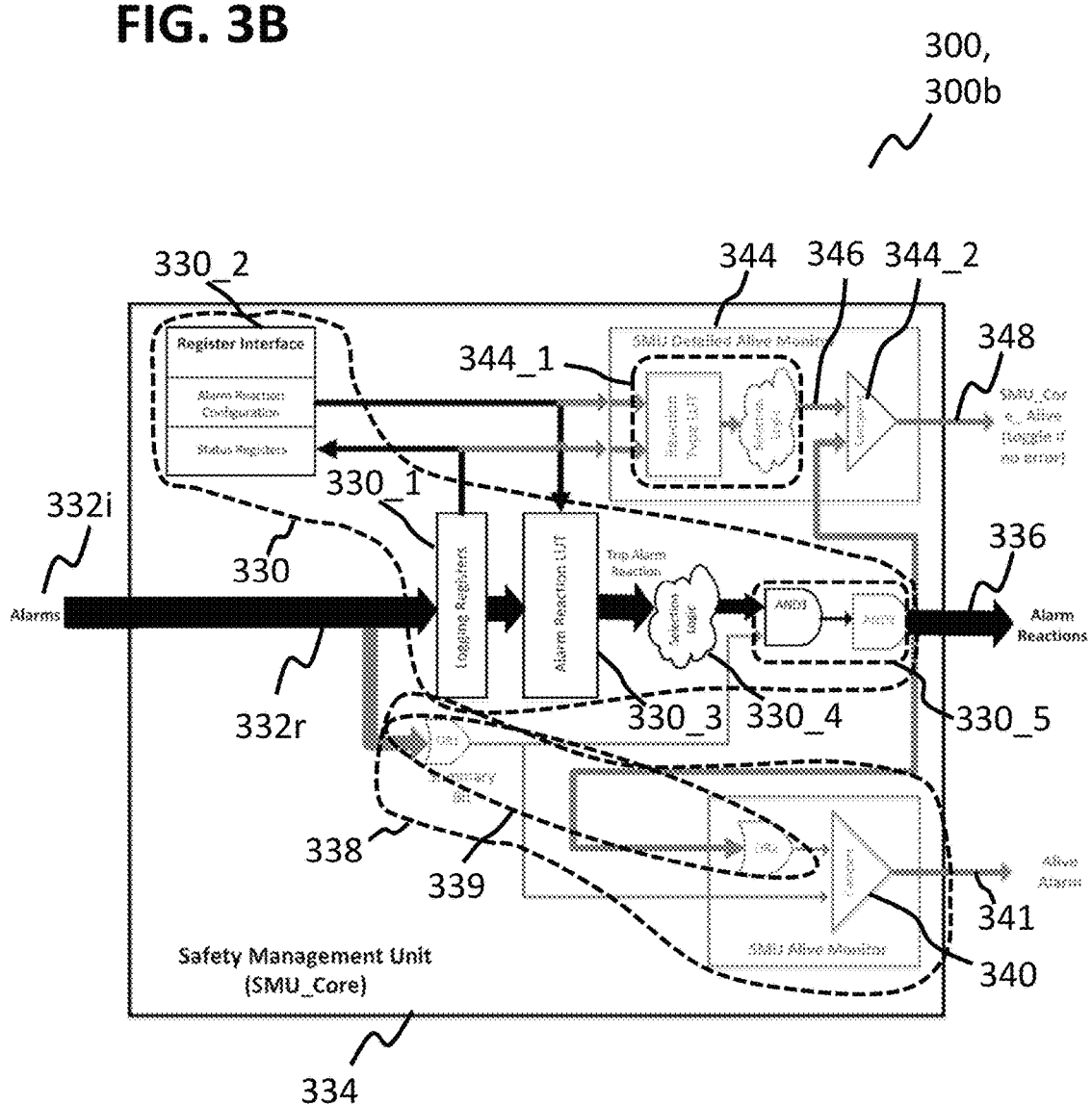
Figure 3C:
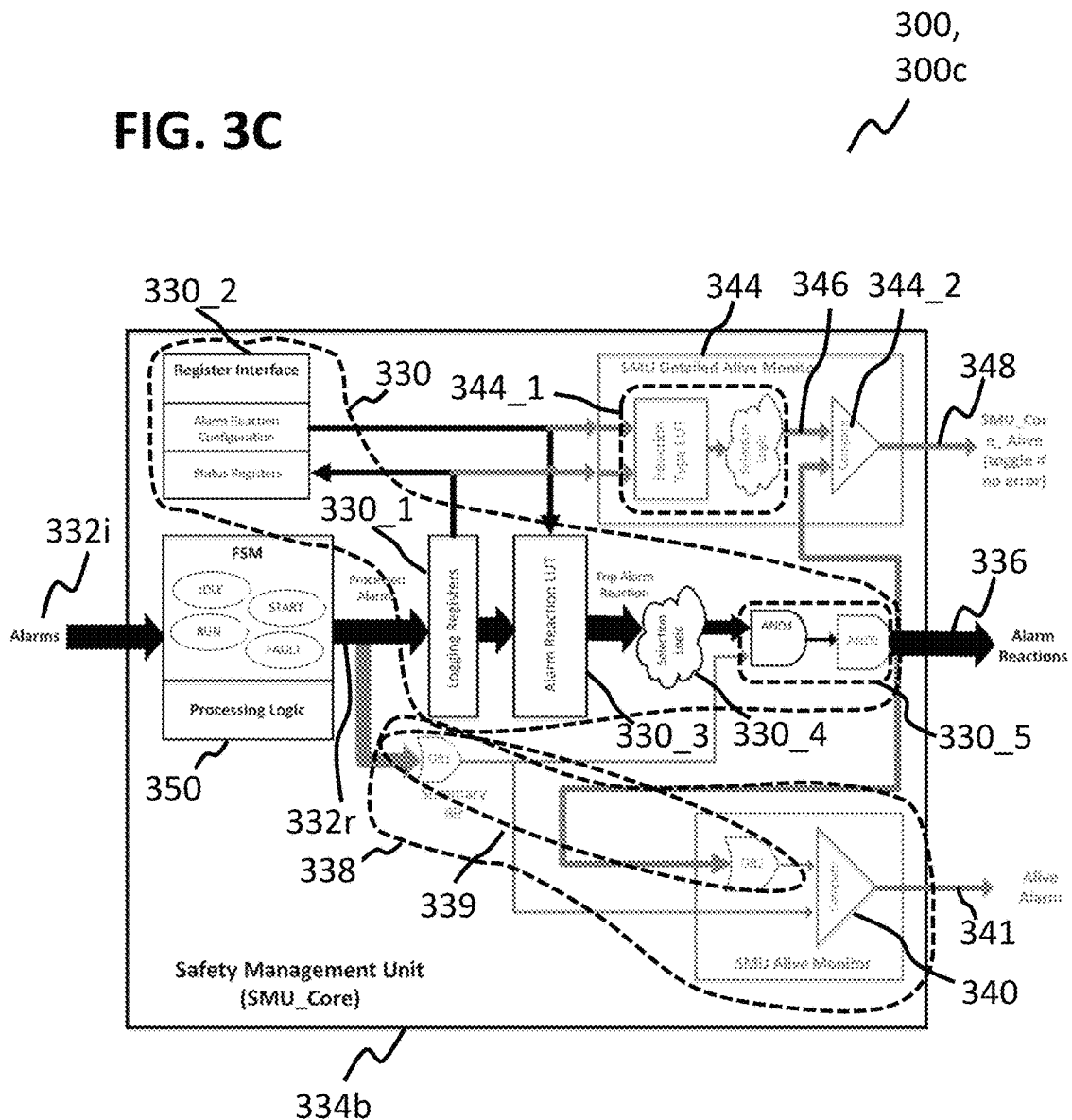

FIG. 3A, FIG. 3B and FIG. 3C each show a block diagram of an alarm handling circuitry 300 in accordance with various embodiments.

As shown in FIG. 3A, the alarm handling circuitry 300, 300a may, in various embodiments, include an alarm processing circuit 330 configured to process a received alarm 332r and to provide a processed alarm response signal 336, a first monitoring circuit 338 configured to determine whether the alarm processing circuit 330 operates, and a second monitoring circuit 344 configured to determine at least one of a plurality of different types of failure of the alarm processing circuit 330.

The alarm processing circuit 330 may in various embodiments be determined to operate if the alarm processing circuit 330 processes the received alarm 332r and provides the processed alarm response signal 336, which may be required to be the processed alarm response signal 336 which is foreseen for the (e.g. type of) received alarm 332r.

The alarm processing circuit 330 may in various embodiment be determined to not operate in a case where the received alarm 332r is not processed, a wrong (e.g. not foreseen for the (e.g. type of) received alarm 332r) processed alarm response signal 336 is provided, and/or in a case where a processed alarm response signal 336 is provided, even though no received alarm 332r was received.

A combination of the alarm processing circuit 330, the first monitoring circuit 338, and the second monitoring circuit 344 may in various embodiments, as shown in FIG. 3B and FIG. 3C, also be referred to as a safety management unit (SMU), in a case of the safety management unit being located in a core voltage domain (and also in a core clock domain) of an electronic system (e.g., in a microcontroller), it may be referred to as a core safety management unit, core SMU or SMU_core 334, 334b.

The SMU_core 334, 334b in the core voltage domain may in various embodiments be configured to collect all errors in the electronic system (e.g., the microcontroller) and to generate an appropriate reaction to get the system into a safe state or to inform an outer system, into which the electronic system may be integrated, of a malfunction. This highly critical function may therefore need some mechanisms to detect any errors within it. For this purpose, in various embodiments, a mechanism referred to as "alive monitor" and "detailed alive monitor", respectively, is provided.

As shown in FIG. 3B and FIG. 3C, the alarm processing circuit 330 may, in various embodiments, include at least one logging register 330_1, which may be configured to log the received alarm 332r.

In various embodiments, the alarm processing circuit 330 may further include a register interface 330_2, to which the received alarm 332r may be provided, e.g. by the logging register 330_1. The register interface 330_2 may in various embodiments, be configured to store an alarm reaction configuration and at least one status register.

In various embodiments, the alarm processing circuit 330 may further include an alarm reaction lookup table (LUT) 330_3, which may be configured to receive the received alarm 332r from the logging register 330_1, and to receive the alarm reaction configuration and/or the at least one status register from the register interface 330_2. From the alarm reaction lookup table 330_3, an alarm reaction may be selected, e.g. using a selection logic 330_4, depending on the received alarm 332r and the alarm reaction configuration and/or the at least one status register.

In various embodiments, the alarm processing circuit 330 may further include a filter unit 330_5, which may for example be configured, e.g. using an AND logic, to process the selected alarm reaction, e.g. to provide the processed alarm 336, only in a case of the received alarm 332r being received. Thereby, a (faulty) generation of the processed alarm 336 by parts of the alarm processing circuit 330 without the received alarm 332r being present may be prevented.

In various embodiments, the received alarm 332r may be at least one alarm of a group of alarms, the group including a power related alarm, e.g. from a voltage sensor/monitor configured to monitor external and/or internal voltage regulators, a clock related alarm, e.g. from a monitor/sensor configured to monitor a clock and/or from a monitor configured to report on a loss of lock that may occur in a system phase locked loop (PLL) and/or in a peripheral PLL, a temperature related alarm, e.g. from a temperature sensor configured to measure a temperature of a die on which the alarm handling circuitry 300 may be arranged, an alarm from a lockstep comparator, which may for example be configured to monitor a state of a CPU, like e.g. shown in FIG. 1, an error correction related alarm, e.g. related to an ECC based error correction performed on a memory device (e,g, an SRAM and/or a program FLASH memory device) that may be part of or coupled with the alarm handling circuitry 300 (the error correction related alarm may for example be related to a single bit error correction, a double bit error correction, and/or to an uncorrectable error), an interconnect related alarm, e.g. an alarm raised by a processor interconnect safety mechanism and/or an alarm raised by a standard error reporting mechanism from a shared resource interconnect (SRI) and/or a system peripheral bus (SPB), a register related alarm, e.g. raised by a register monitor, an address related alarm, e.g. an alarm (raised by, for example, an SRAM monitor and/or a program FLASH monitor) indicating an address buffer overflow and/or an addressing fault, an input/output related alarm, e.g. provided by an input/output monitoring module, and an alarm related to an exception state, which may for example be provided by an interrupt router and interrupt control units hardware monitor and/or by a CPU exceptions monitor, which may be configured to raise an alarm in a case of a CPU exception state, like e.g. an interrupt or a trap.

In various embodiments, the processed alarm response signal 336 may include at least one of a group of alarm response signals, the group including an activation of a fault signaling protocol (FSP), a generation of an interrupt request to an interrupt request controller (IR controller), a generation of a non maskable interrupt request to a system control unit, a generation of a reset request to the system control unit leading to a system reset and/or to an application reset, an activation of a port emergency stop signal, a generation of a central processing unit reset request, and no reaction.

The fault signaling protocol may, in various embodiments, be configured to report internal faults to an external environment. The FSP may be configured to use the following modes: a bi-stable single pin output (push-pull active low configuration using FSP[0]), which may also be referred to as ErrorPin, a timed dual rail coding configured to use two inverted values on FSP[0] and FSP[1], and a single-bit timed protocol configured to use FSP[0].

In various embodiments, the FSP value, which may be driven by a microcontroller, may be observed via an internal status flag.

In various embodiments, a monitor may further be provided for checking a timing and the state properties of the FSP protocol when a fault is reported.

As shown in FIG. 3A, FIG. 3B and FIG. 3C, the alarm handling circuitry 300, 300a may, in various embodiments, further include a first monitoring circuit 338. The first monitoring circuit 338 may, in various embodiments, be configured to determine whether the alarm processing circuit 330 operates.

In various embodiments, as shown in FIG. 3B and FIG. 3C, the first monitoring circuit 338 may include an alarm existence determination circuit 339 configured to determine whether an alarm 332r has been received and/or whether a processed alarm response signal 336 is provided.

The first monitoring circuit 338 may, in various embodiments, further include a response provision determination circuit 340 configured to determine whether the processed alarm response signal 336 is provided in case it has been determined that the alarm 332r has been received, and configured to determine whether the alarm 332r has been received in case it has been determined that the processed alarm response signal 336 is provided. The response provision determination circuit 340 may for example include or consist of a comparison unit that may be configured to compare the received alarm 332r with the processed alarm response signal 336. The response provision determination circuit 340 may, in various embodiments, provide an alive signal 341 in a case of a match between the processed alarm response signal 336 and the received alarm 332r, in other words if the processed alarm response signal 336 is provided in a case of an alarm 332r being received, and vice versa. The first monitoring circuit 338 may therefore also be referred to as the "alive monitor" or as an "SMU alive monitor", since it may indicate that the alarm processing circuit 330 of the SMU is "alive" and working properly, and may provide an indication of incorrect operation, which may be similar to an alarm and may also be referred to as alarm in a case of a mismatch between the processed alarm response signal 336 and the received alarm 332r, in other words if the processed alarm response signal 336 is provided without the alarm 332r having been received and/or if the alarm 332r is received, and no processed alarm response signal 336 is provided.

In various embodiments, as the indication of correct operation (the alive signal 341) and of incorrect operation (the alarm), respectively, the alive monitor (the first monitoring circuit) 338 may generate a pulsating signal (the alive signal 341), wherein a presence of the pulse may imply that the SMU_core 334, 334b (in particular, the alarm processing circuit 330 of the SMU and the first monitoring circuit 338 itself) is working properly, i.e. that it is "alive" (and an absence of the pulsating signal may correspondingly mean that something is not correct, which may be considered an alarm). The SMU alive monitor 338 may use a summary of all the alarms (e.g., of the received alarms 332r) and alarm reactions (e.g., of the processed alarm response signal 336) to check if the SMU 334, 334b is functioning properly. The SMU alive monitor 338 may send an alive alarm in case the SMU_core 334, 334b does not function correctly.

In various embodiments, as the indication of correct vs. incorrect operation (the alive signal/the alarm), the alive monitor (the first monitoring circuit) 338 may use a different protocol from the one described above using the pulsating signal. For example, a frequency signal may be sent in case that the SMU_core is alive, and the frequency signal may be tied to zero in a case of an alarm, or the frequency signal may be tied to zero in a case that everything is OK, and may send the frequency signal in a case of an alarm.

The SMU alive monitor 338 may be a compact way of detecting a malfunction of the SMU.

The alarm handling circuitry 300, 300a may, in various embodiments, further include a second monitoring circuit 344. The second monitoring circuit 344 may, in various embodiments, be configured to determine at least one of a plurality of different types of failure of the alarm processing circuit 336.

As shown in FIG. 3B and FIG. 3C, in various embodiments, the second monitoring circuit 344 may include a secondary alarm processing circuit 344_1 configured to process the received alarm 332r and to provide a secondary processed alarm response signal 346.

In various embodiments, the second monitoring circuit 344 may further include a response comparison circuit 344_2 configured to determine whether the secondary processed alarm response signal 346 matches the processed alarm response signal 336.

In various embodiments, the comparison circuit 344_2 of the second monitoring circuit 344 may be configured to provide a comparison result 348.

The secondary alarm processing circuit 344 may in various embodiments also be referred to as the "detailed alive monitor" 344, since on the one hand, the comparison result may be suitable for assessing whether the alarm processing circuit 336 is "alive" and working properly, and on the other hand the comparison result may be suitable for obtaining a more detailed information regarding a type of error and/or other details, for example a source of an issue (like a malfunction/an alarm), its timing parameters, an expected reaction, etc.

The detailed alive monitor 344 may, in various embodiments, be configured to indicate that it is working properly. Comparable to what is described above in context with the first monitoring circuit 338, the detailed alive monitor may for example generate a pulsating signal, wherein a presence of the pulse may imply that the SMU_core 334, 334b is working properly, i.e. that it is "alive". However, other protocols, e.g. as described above, may be used for the alive signal and/or a respective alarm. The detailed alive monitor 344 may work on a principle of redundancy. This means that the detailed alive monitor 344 may take an alarm information from status registers (in the register interface 330_2) and may perform a calculation of an output using the configuration registers (in the register interface 330_2). If a thus generated reaction (the secondary processed alarm response signal 346) matches the real SMU_core 334, 334b reaction (the processed alarm response signal 336), then SMU_core 334, 334b is alive, and an alive signal 348 may be generated and may be configured to keep pulsing. If there is a discrepancy between the two, then the alive signal 348 may be configured to no longer pulse (it may for example be tied to zero). Alternatively, as described above, a different protocol may be used for the alive signal from the detailed alive monitor 344 and/or a respective alarm. The detailed alive monitor 344 may be configured to provide a more precise and/or more detailed information than the alive monitor 338, wherein the same alarm(s) may be processed by the first monitoring circuit 338 and the second monitoring circuit 344.

In various embodiments, as shown in FIG. 3C, the alarm handling circuitry 300c may further include an alarm preprocessing circuit 350 configured to provide the received alarm 332r. The alarm preprocessing circuit 350 may in various embodiments be configured to process an incoming alarm 332i for providing the received alarm 332r.

The preprocessing circuit 350 may, depending on a status of a fault signal monitor (FSM), e.g. idle/run/start/fault, provide the received alarm 332r, e.g. to the at least one logging register 330_1, or not provide the received alarm 332r.

The alarm handling circuitry 300c of FIG. 3C may differ from, e.g., the alarm handling circuitry of FIG. 3B by the preprocessing circuit 350.

Figure 4A:
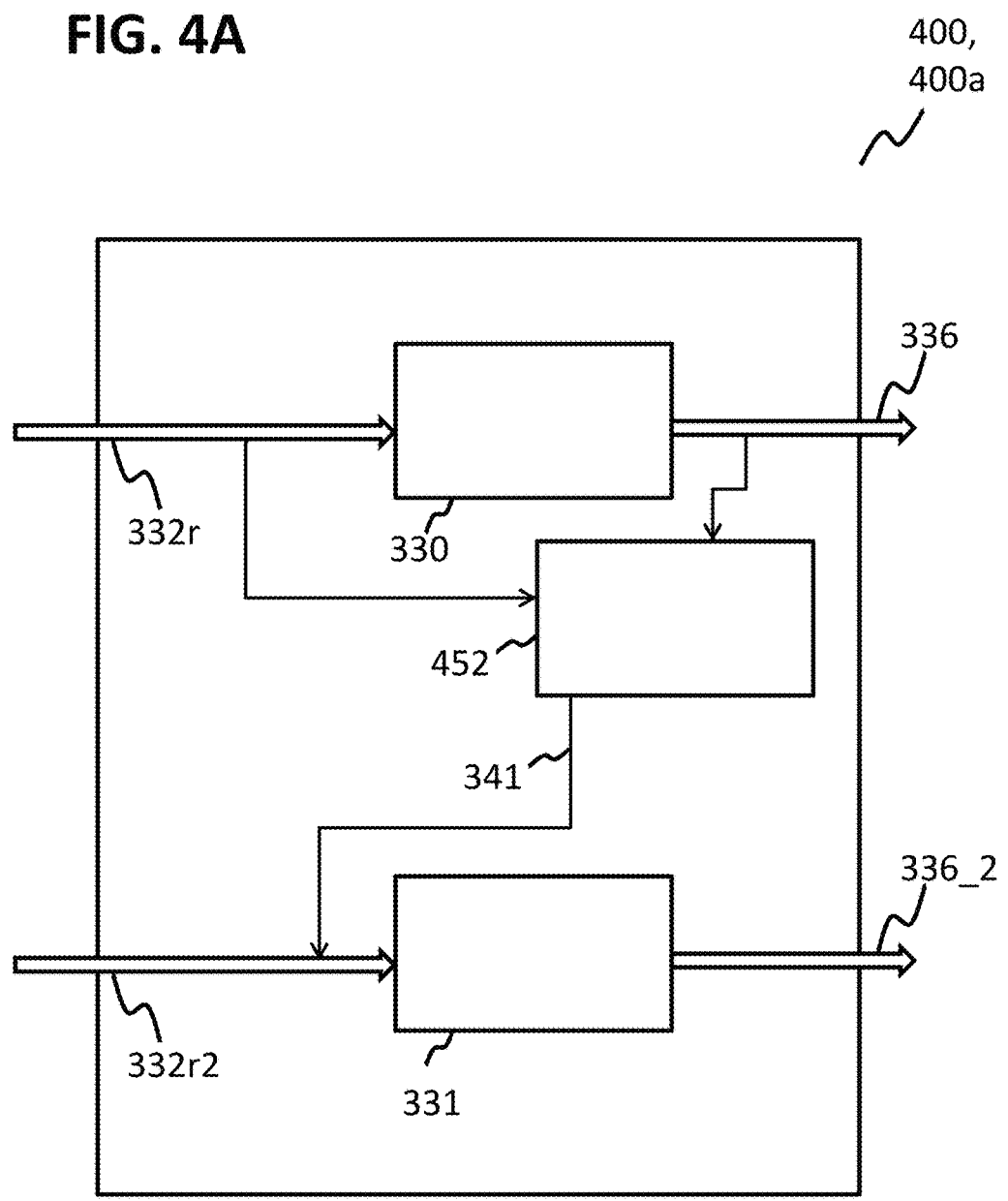
FIGS. 4A, 4B and 4C each show a block diagram of an alarm handling circuitry in accordance with various embodiments.
Figure 4B:
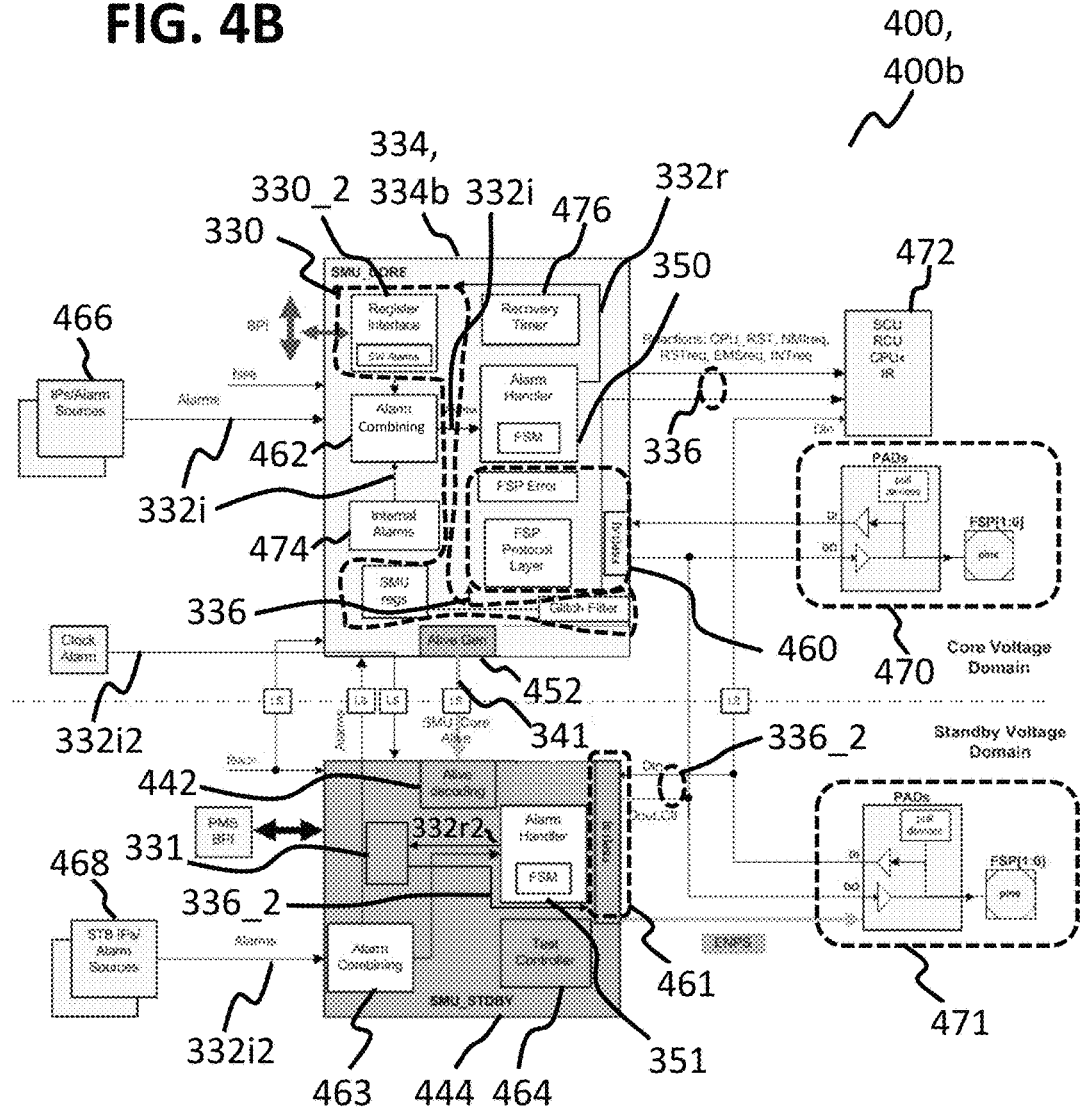
Figure 4C:
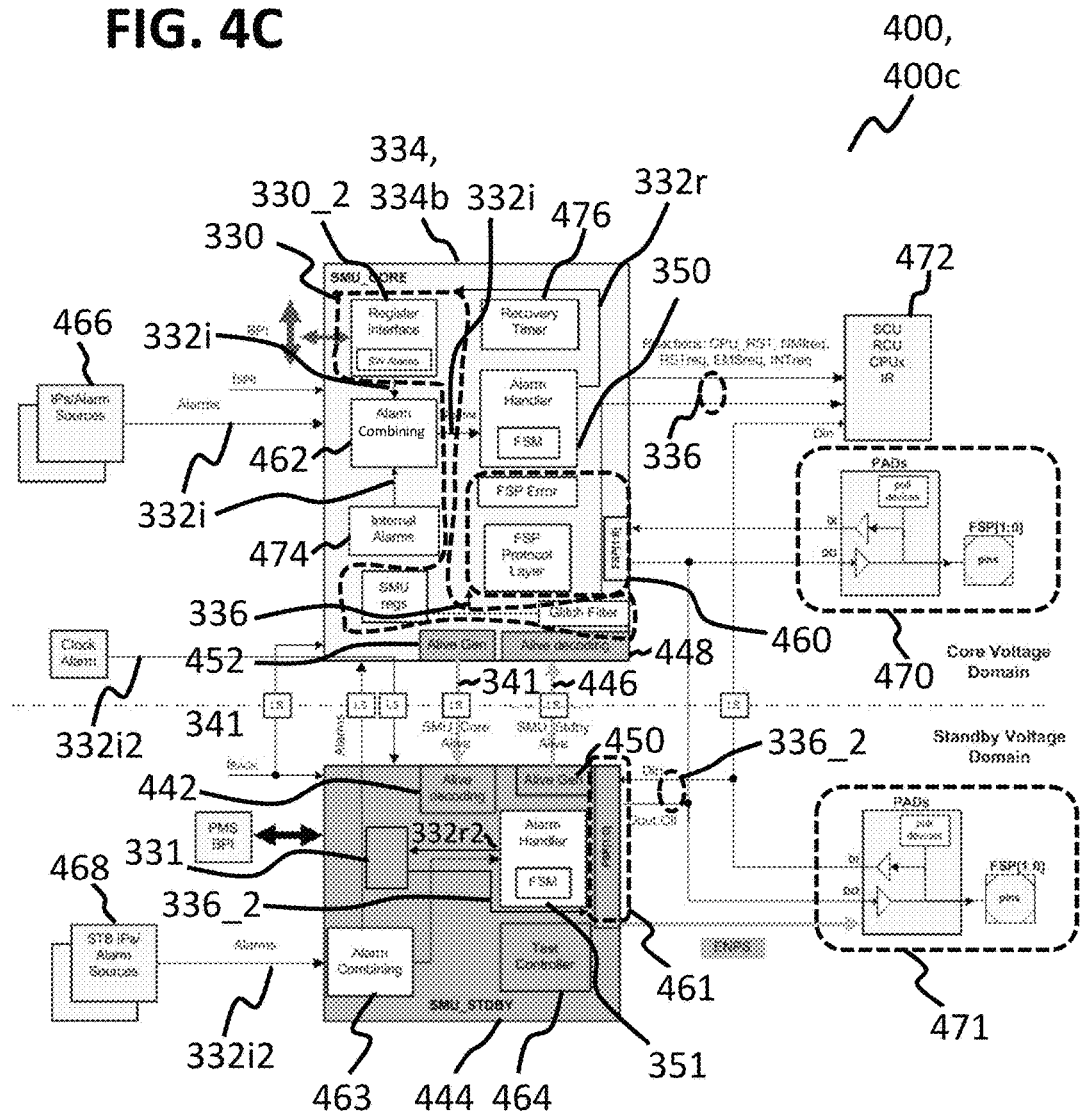

FIGS. 4A, 4B and 4C each show a block diagram 400 of an alarm handling circuitry 400 in accordance with various embodiments.

In various embodiments, as shown in FIG. 4A, FIG. 4B and FIG. 4C, the alarm handling circuitry 400 (e.g., the alarm handling circuitry 400a, 400b and/or 400c, respectively) may include a first alarm processing circuit 330 configured to process a first received alarm 332r and to provide a first processed alarm response signal 336, a second alarm processing circuit 331 configured to process a second received alarm 332r2 and to provide a second processed alarm response signal 336_2, and an interface 452 between the first alarm processing circuit 330 and the second alarm processing circuit 331 configured to input an alive indication signal 341 from the first alarm processing circuit 330 to the second alarm processing circuit 331 indicating whether the first alarm processing circuit 330 is operating.

In various embodiments, an absence of the alive indication signal 341 may be a representation of the second received alarm 332r2. In other words, an absence of the alive indication signal 341 may be processed as the second received alarm 332r2 by the second alarm processing circuit 331.

In various embodiments, the interface 452 may be similar or identical to the first monitoring circuit 338 or to the second monitoring circuit 344 as described above.

In various embodiments, as for example shown in FIG. 3B and FIG. 3C, the interface 452 (in context with FIG. 3A, FIG. 3B and FIG. 3C referred to as the first monitoring circuit 452) may include an alarm existence determination circuit 339 configured to determine whether an alarm 332r has been received and configured to determine whether a processed alarm response signal 336 is provided, and a response provision determination circuit 340 configured to determine whether the processed alarm response signal 336 is provided in case it has been determined that the alarm 332r has been received and configured to determine whether the alarm 332r has been received in case it has been determined that the processed alarm response 336 signal has been provided.

In other words, the interface may be configured to ensure that a processed alarm response signal 336 is generated whenever an alarm 332r has been received, and to furthermore ensure that the processed alarm response signal 336 is generated only if an alarm 332r has been received.

In various embodiments, the indication whether the first alarm processing circuit 330 is operating may be a pulsating signal as described above. If there is a discrepancy between the received alarm 332r and the processed alarm response signal 336, then signal will no longer pulsate, and this may be detected in the second alarm processing circuit 331. In various embodiments, as described above, other protocols may be used for the indication whether the first alarm processing circuit 330 is operating and/or for a respective alarm.

In various embodiments, the alarm handling circuitry 400 may be configured to generate the alive indication signal 341 using the alarm existence determination circuit 339 in combination with the response provision determination circuit 340.

In various embodiments, the alarm existence determination circuit 339 and the response provision determination circuit 340 may be configured and used as described above.

In various embodiments, the first alarm processing circuit 330 and the interface 452 may be part of the core SMU 334, 334*b*.

In various embodiments, the second alarm processing circuit 331 may be part of an SMU located in a standby voltage domain (and also a standby clock domain), thus also referred to as the standby SMU or as SMU_stdby 444.

As shown in FIG. 4B and FIG. 4C for the alarm handling circuitries 400*b* and 400*c*, in the alarm handling circuitry 400, the received alarm 332*r* may in various embodiments be generated from an incoming alarm 332*i*, which may be provided by an external alarm source 466 (which may for example provide alarms from external sensors or the like), and/or by an internal alarm source 474 (which may for example provide alarms related to a malfunctioning of a software of the alarm handling circuitry 400 itself, e.g. of a register interface 330_2 as described above in context with FIG. 3B and FIG. 3C, or the like).

In various embodiments, the generating of the received alarm 332*r* may include combining the incoming alarms 332*i* using an alarm combiner 462. It may, in various embodiments, further include preprocessing of the incoming alarms 332*i* using an alarm preprocessing unit 350, e.g. as described above in context with FIG. 3B and FIG. 3C. The alarm preprocessing unit 350 may also be referred to as alarm handler.

Similarly, in various embodiments, in the alarm handling circuitry 400, the second received alarm 332*r*2 may be generated from a second incoming alarm 332*i*2, which may be provided by an external alarm source 468 (which may for example provide alarms from external sensors or the like), and/or by an internal alarm source (which may for example provide alarms related to a malfunctioning of a software of the alarm handling circuitry 400 itself (not shown), and/or from a test controller 464 providing internal alarms as a test alarm, or the like).

In various embodiments, the generating of the second received alarm 332*r*2 may include combining the incoming alarms 332*i*2 using a second alarm combiner 463. It may, in various embodiments, further include preprocessing of the second incoming alarms 332*i*2 using a second alarm preprocessing unit 351, e.g. similar to the alarm processing unit 350 described above in context with FIG. 3B and FIG. 3C.

In various embodiments, the providing the first processed alarm response signal 336 may include an activation of a fault signaling protocol, e.g. using an FSP handler 460, 470, which may be configured to use various modes for signaling a fault (e.g. a bi-stable single pin output, a timed dual rail conding and/or a single-bit timed protocol, e.g. as described above in connection with FIG. 3B and FIG. 3C), and/or a providing the first processed alarm response signal 336 to an external device 472, for example to a central processing unit, a sensor control unit, a redundancy control unit, and/or an interrupt request controller.

In various embodiments, the providing the second processed alarm response signal 336_2 may include an activation of a fault signaling protocol, e.g. using a second FSP handler 461, 471, which may be configured to use various modes for signaling a fault (e.g. a bi-stable single pin output, a timed dual rail conding and/or a single-bit timed protocol, e.g. as described above in connection with FIG. 3B and FIG. 3C), and/or a providing the second processed alarm response signal 336_2 to the external device 472, to which also the first processed alarm response signal 336 may be provided, and/or a providing the second processed alarm response signal 336_2 to the FSP handler 460, 470, to which also the first processed alarm response signal 336 may be provided.

In various embodiments, the the alarm handling circuitry 400 may further include a recovery timer unit 476, which may serve as an internal monitoring device for monitoring an execution of critical software error handlers.

In various embodiments, as shown for example in FIG. 4C, the alarm handling circuitry 400*c* may further include a further interface 450 between the first alarm processing circuit 330 and the second alarm processing circuit 331 configured to input a further alive indication signal 446 from the second alarm processing circuit 331 to the first alarm processing circuit 330 indicating whether the second alarm processing circuit 331 is operating.

In various embodiments, an absence of the further alive indication signal 446 may be a representation of the first received alarm 332*r*. In other words, an absence of the further alive indication signal 446 may be processed as the first received alarm 332*r* by the first alarm processing circuit 330.

In various embodiments, the alive signal 341 from the SMU_core 334, 334*b* (e.g. from the interface/the first monitoring circuit 338) may be decoded and handled by SMU_stdby 444, and the alive signal 446 from SMU_stdby (e.g., from the further interface 450) may be handled by the SMU_core 334, 334*b*, making a strong failure detection system.

In various embodiments, the alarm handling circuitry 400 may further include a first power supply (in FIG. 4B and FIG. 4C only represented as "Core Voltage Domain") configured to provide power to the first alarm processing circuit 330, and a second power supply (in FIG. 4B and FIG. 4C only represented as "Standby Voltage Domain") configured to provide power to the second alarm processing circuit 331.

In various embodiments, the second power supply may be independent of the first power supply. This may provide a diverse way to detect issues in the SMU_core 334, 334*b* in a different clock- and power domain.

The alarm handling circuitry 400 may allow an implementation of safety measures against Common Case Failures (CCF) due to a possible redundant implementation of SMUs (e.g., SMU_core and SMU_stdby) in two independent power- and clock domains.

In various embodiments, the CCF may be monitored and failures (e.g., clock system failures and/or power supply failures) may be reported via an FSP interface.

In various embodiments, an additional separated FSP (not shown) may be used to make SMU signaling independent for both redundant SMUs 334/334*b*, 444

In various embodiments, the first received alarm 332*r* and/or the second received alarm 332*r*2 may be at least one alarm of a group of alarms, the group including a power related alarm, a clock related alarm, a temperature related alarm, an alarm from a lockstep comparator, an error correction related alarm, an interconnect related alarm, a register related alarm, an address related alarm, an input/output related alarm, and an alarm related to an exception state.

In various embodiments, in a case of the first received alarm 332*r* being one of a power related alarm, a clock related alarm, and a temperature related alarm, the second received alarm 332r2 may be the same as the first received alarm 332r.

In various embodiments, the first processed alarm response signal 336 may include at least one of a group of alarm response signals, the group including an activation of a fault signaling protocol, a generation of an interrupt request to an interrupt request controller, a generation of a non maskable interrupt request to a system control unit, a generation of a reset request to the system control unit leading to a system reset and/or to an application reset, an activation of a port emergency stop signal, a generation of a central processing unit reset request, and no reaction.

In various embodiments, the second processed alarm response signal 336_2 may include at least one of a group of alarm response signals, the group including an activation of a fault signaling protocol and no reaction.

Figure 5B:
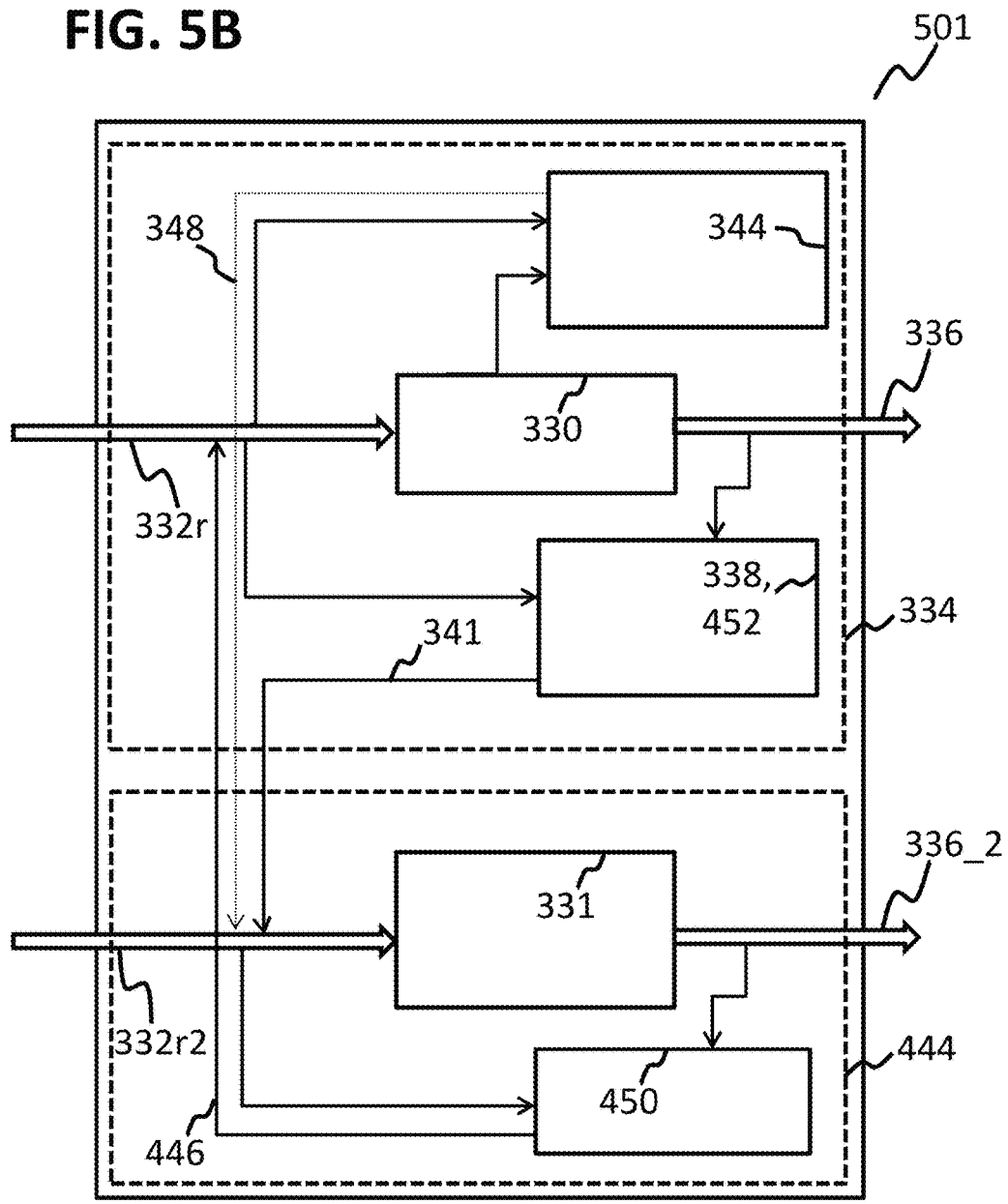

In various embodiments, the detailed alive monitor signal 348 as described above may be used instead of or in addition to the alive indication signal 341 (shown as dotted arrows in FIG. 5A and FIG. 5B, respectively). In other words, the interface 452 between the first alarm processing circuit 330 and the second alarm processing circuit 331 may in various embodiments be configured to input the detailed alive indication signal 348 from the first alarm processing circuit 330 to the second alarm processing circuit 331 indicating whether the first alarm processing circuit 330 is operating.

FIGS. 5A and 5B each show a block diagram of an alarm handling circuitry 500 and 501, respectively, in accordance with various embodiments.

As shown in FIG. 5A and in FIG. 5B, in various embodiments, the alarm handling circuitry 500, 501 may be considered to represent a combination of an alarm handling circuitry 300, e.g. as described in context with FIGS. 3A to 3C and an alarm handling circuitry 400, e.g. as described in context with FIGS. 4A to 4C.

The alarm handling circuitry 500 may for example be understood as including an alarm handling circuitry 300 (including the first monitoring circuit 338 and the second monitoring circuit 344 as described in context with FIG. 3A to 3C) and a further alarm processing circuitry 444 as described in context with FIG. 4A to 4C.

As a different approach with a similar result, the alarm handling circuitry 500 may for example be understood as including an alarm handling circuitry 400 (including the first alarm processing circuit 330, the interface/the first monitoring circuit 452/338 and the second alarm processing circuitry 331, e.g. as described in context with FIG. 4A to 4C), wherein the first alarm processing circuit 334, 334b and the interface/the first monitoring circuit 452/338 may, together with a second alarm monitoring circuit 344, be part of an SMU, e.g. a core SMU 334 as described in context with FIG. 3A to FIG. 3C.

Specifically, the alarm handling circuitry 500 may include a core SMU 334 including a first alarm processing circuit 330, a first monitoring circuit 338 and a second monitoring circuit 344 and a standby SMU 444 including a second alarm processing circuit 331.

In various embodiments, the first alarm processing circuit 330 may be configured to process a first received alarm 332r and to provide a first processed alarm response signal 336.

In various embodiments, the first monitoring circuit 338 may be configured as an interface 452 between the first alarm processing circuit 330 and the second alarm processing circuit 331, and may be configured to input an alive indication signal from the first alarm processing circuit 330 to the second alarm processing circuit 331 indicating whether the first alarm processing circuit 330 is operating.

In various embodiments, the second monitoring circuit 344 may be configured to determine at least one of a plurality of different types of failure of the alarm processing circuit 330.

In various embodiments, the second alarm processing circuit 331 may be configured to process a second received alarm 332r2 and to provide a second processed alarm response signal 336_2.

In various embodiments, the alive indication signal 341 may be configured to be provided by the first monitoring circuit 338, e.g. as shown in FIG. 5A and FIG. 5B. However, in various embodiments (not shown), the alive indication signal may be provided by the second monitoring circuit 344, for example the detailed alive indication signal 348 (as e.g. shown in FIG. 3B and FIG. 3C) may be used instead of or in addition to the alive indication signal 341.

In various embodiments, the alarm handling circuitry may further include a third monitoring circuit 450 configured to determine whether the further alarm processing circuit 331 operates, which may form an interface between the alarm processing circuit 330 and the second alarm processing circuit 331. The third monitoring circuit 450 may be configured to input a further alive indication signal 446 from the further alarm processing circuit 331 to the alarm processing circuit 330 indicating whether the further alarm processing circuit 331 is operating.

The further alarm processing circuit 331 may in various embodiments be determined to operate if the further alarm processing circuit 331 processes the further received alarm 332r2 and provides the processed alarm response signal 336_2, which may be required to be the processed alarm response signal 336_2 which is foreseen for the (e.g. type of) received alarm 332r2.

The further alarm processing circuit 331 may in various embodiment be determined to not operate in a case where the further received alarm 332r2 is not processed, a wrong (e.g. not foreseen for the (e.g. type of) further received alarm 332r2) further processed alarm response signal 336_2 is provided, and/or in a case where a further processed alarm response signal 336_2 is provided, even though no further received alarm 332r2 was received.

Referring to FIG. 5B, in various embodiments, the third monitoring circuit 450 may include a further alarm existence determination circuit configured to determine whether the further alarm has been received and configured to determine whether the second processed alarm response signal 336_2 is provided, and a further response provision determination circuit configured to determine whether the second processed alarm response signal 336_2 is provided in case it has been determined that the second alarm 332r2 has been received and configured to determine whether the second alarm 332r2 has been received in case it has been determined that the second processed alarm response signal 336_2 is provided.

In various embodiments, an absence of the alive indication signal 341 may be a representation of the second received alarm 332r2.

In various embodiments, an absence of the further alive indication signal 446 may be a representation of the received alarm 332r.

In various embodiments, the alarm handling circuitry may further include a power supply (not shown) configured to provide power to the core SMU 334, and a further power supply configured to provide power to the standby SMU 444.

In various embodiments, the further power supply may be independent of the power supply.

In various embodiments, in a case of the received alarm 332r being one of a power related alarm, a clock related alarm, and a temperature related alarm, the further received alarm 332r2 may be the same as the received alarm 332r.

In various embodiments, the second processed alarm response signal 336_2 may include at least one of a group of alarm response signals, the group including an activation of a fault signaling protocol and no reaction.

FIG. 6 shows a process flow 600 of a method of handling an alarm in accordance with various embodiments.

In various embodiments, the method may include providing a processed alarm response signal by processing a received alarm using an alarm processing circuit (in 610), determining, using a first monitoring circuit, whether the alarm processing circuit operates (in 620), and determining, using a second monitoring circuit, at least one of a plurality of different types of failure of the alarm processing circuit (in 630).

Figure 7:
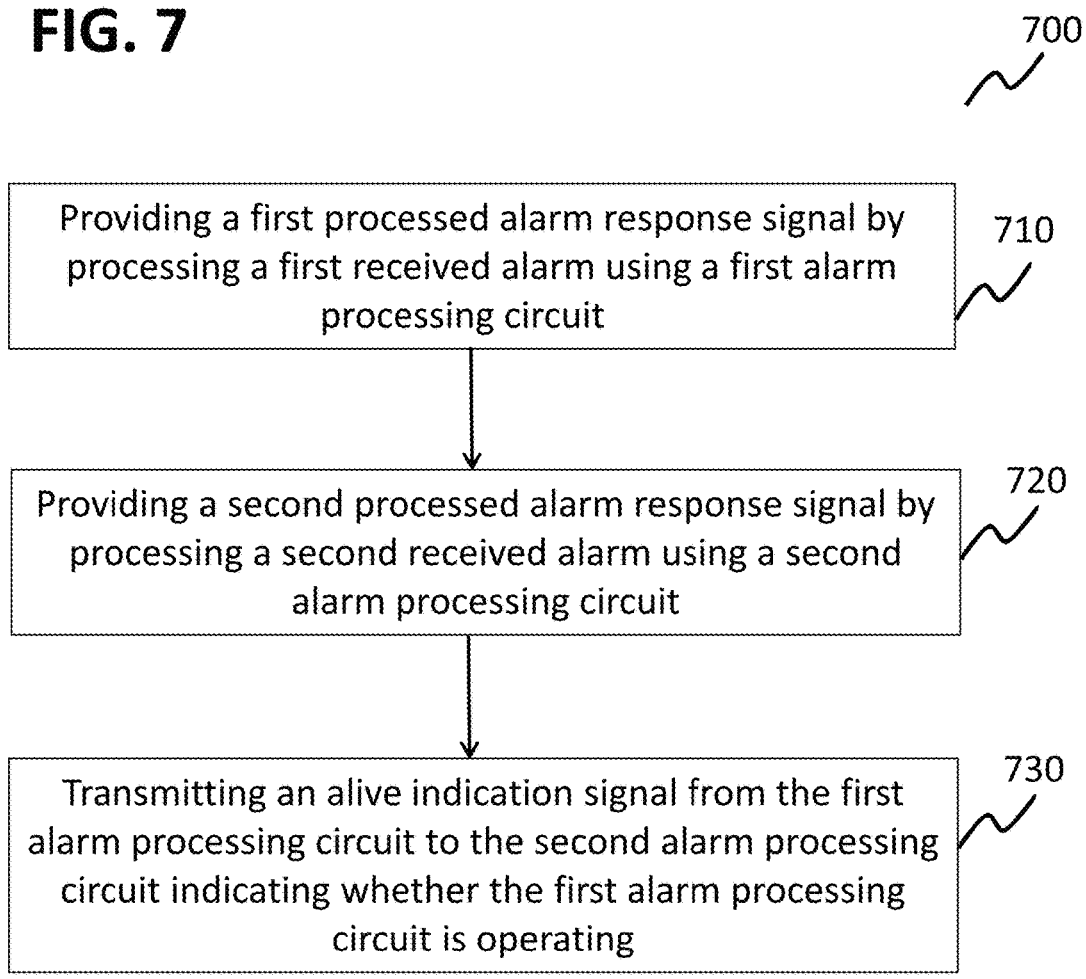
FIG. 7 shows a process flow of a method of handling an alarm in accordance with various embodiments.

FIG. 7 shows a process flow 700 of a method of handling an alarm in accordance with various embodiments.

In various embodiments, the method may include providing a first processed alarm response signal by processing a first received alarm using a first alarm processing circuit (in 710), providing a second processed alarm response signal by processing a second received alarm using a second alarm processing circuit (in 720), and transmitting an alive indication signal from the first alarm processing circuit to the second alarm processing circuit indicating whether the first alarm processing circuit is operating (in 730).

In various embodiments, an alarm handling circuitry is provided. The alarm handling circuitry may include a first alarm processing circuit configured to process a first received alarm and to provide a first processed alarm response signal, a second alarm processing circuit configured to process a second received alarm and to provide a second processed alarm response signal, and an interface between the first alarm processing circuit and the second alarm processing circuit configured to input an alive indication signal from the first alarm processing circuit to the second alarm processing circuit indicating whether the first alarm processing circuit is operating.

In various embodiments, an absence of the alive indication signal may be a representation of the second received alarm.

In various embodiments, the alarm handling circuitry may further include an alarm existence determination circuit configured to determine whether the alarm has been received and configured to determine whether a processed alarm response signal is provided, and a response provision determination circuit configured to determine whether the processed alarm response signal is provided in case it has been determined that the alarm has been received and configured to determine whether the alarm has been received in case it has been determined that the processed alarm response signal has been provided.

In various embodiments, the alarm handling circuitry may be configured to generate the alive indication signal using the alarm existence determination circuit in combination with the response provision determination circuit.

In various embodiments, the alarm handling circuitry may further include a further interface between the first alarm processing circuit and the second alarm processing circuit configured to input a further alive indication signal from the second alarm processing circuit to the first alarm processing circuit indicating whether the second alarm processing circuit is operating.

In various embodiments, the interface and the further interface may form an integral unit.

In various embodiments, an absence of the further alive indication signal may be a representation of the first received alarm.

In various embodiments, the alarm handling circuitry may further include a first power supply configured to provide power to the first alarm processing circuit, and a second power supply configured to provide power to the second alarm processing circuit.

In various embodiments, the second power supply may be independent of the first power supply.

In various embodiments, the alarm handling circuitry may further include a first clock source configured to provide a clock signal to the first alarm processing circuit, and a second clock source configured to provide a further clock signal to the second alarm processing circuit.

In various embodiments, the second clock source may be independent of the first clock source.

In various embodiments, the first received alarm and/or the second received alarm may be at least one alarm of a group of alarms, the group including a power related alarm, a clock related alarm, a temperature related alarm, an alarm from a lockstep comparator, an error correction related alarm, an interconnect related alarm, a register related alarm, an address related alarm, an input/output related alarm, and an alarm related to an exception state.

In various embodiments, in a case of the first received alarm being one of a power related alarm, a clock related alarm, and a temperature related alarm, the second received alarm may be the same as the first received alarm.

In various embodiments, the first processed alarm response signal may include at least one of a group of alarm response signals, the group including
án activation of a fault signaling protocol, a generation of an interrupt request to a central processing unit, a generation of a non maskable interrupt request to a system control unit, a generation of a reset request to the system control unit leading to a system reset and/or to an application reset, an activation of a port emergency stop signal, a generation of a central processing unit reset request, and no reaction.

In various embodiments, the second processed alarm response signal may include at least one of a group of alarm response signals, the group including an activation of a fault signaling protocol and no reaction.

In various embodiments, a method to generate an alive signal and a detailed alive signal is provided. The method may include providing a first processed alarm response signal by processing a first received alarm using a first alarm processing circuit, providing a second processed alarm response signal by processing a second received alarm using a second alarm processing circuit, and transmitting an alive indication signal from the first alarm processing circuit to the second alarm processing circuit indicating whether the first alarm processing circuit is operating.

In various embodiments, an absence of the alive indication signal may be a representation of the second received alarm.

In various embodiments, the method may further include generating the alive indication signal, including determining whether an alarm has been received, and determining whether the processed alarm response signal is provided in case it has been determined that the alarm has been received.

In various embodiments, the method may further include transmitting a further alive indication signal from the second alarm processing circuit to the first alarm processing circuit indicating whether the second alarm processing circuit is operating.

In various embodiments, an absence of the further alive indication signal may be a representation of the first received alarm.

In various embodiments, the first received alarm and/or the second received alarm may be at least one alarm of a group of alarms, the group including a power related alarm, a clock related alarm, a temperature related alarm, an alarm from a lockstep comparator, an error correction related alarm, an interconnect related alarm, a register related alarm, an address related alarm, an input/output related alarm, and an alarm related to an exception state.

In various embodiments, in a case of the first received alarm being one of a power related alarm, a clock related alarm, and a temperature related alarm, the second received alarm may be the same as the first received alarm.

In various embodiments, the first processed alarm response signal may include at least one of a group of alarm response signals, the group including an activation of a fault signaling protocol, a generation of an interrupt request to a central processing unit, a generation of a non maskable interrupt request to a system control unit, a generation of a reset request to the system control unit leading to a system reset and/or to an application reset, an activation of a port emergency stop signal, a generation of a central processing unit reset request, and no reaction.

In various embodiments, the second processed alarm response signal may include at least one of a group of alarm response signals, the group including an activation of a fault signaling protocol and no reaction.

In various embodiments, the method may further include providing at least one of a plurality of different types of failure of the first alarm processing circuit.

In various embodiments, the method may further include providing the first received alarm by pre-processing an incoming alarm using an alarm preprocessing circuit.

In various embodiments, an alarm handling circuitry is provided. The alarm handling circuitry may include an alarm processing circuit configured to process a received alarm and to provide a processed alarm response signal, a first monitoring circuit configured to determine whether the alarm processing circuit operates by processing the received alarm and providing the processed alarm response signal, and a second monitoring circuit configured to determine at least one of a plurality of different types of failure of the alarm processing circuit.

In various embodiments, the first monitoring circuit nay include an alarm existence determination circuit configured to determine whether an alarm has been received and configured to determine whether a processed alarm response signal is provided, and a response provision determination circuit configured to determine whether the processed alarm response signal is provided in case it has been determined that the alarm has been received and configured to determine whether the alarm has been received in case it has been determined that the processed alarm response signal has been provided.

In various embodiments, the second monitoring circuit may include a secondary alarm processing circuit configured to process the received alarm and to provide a secondary processed alarm response signal, and a response comparison circuit configured to determine whether the secondary processed alarm response signal matches the processed alarm response signal.

In various embodiments, the received alarm may be at least one alarm of a group of alarms, the group including a power related alarm, a clock related alarm, a temperature related alarm, an alarm from a lockstep comparator, an error correction related alarm, an interconnect related alarm, a register related alarm, an address related alarm, an input/output related alarm, and an alarm related to an exception state.

In various embodiments, the processed alarm response signal may include at least one of a group of alarm response signals, the group including an activation of a fault signaling protocol, a generation of an interrupt request to a central processing unit, a generation of a non maskable interrupt request to a system control unit, a generation of a reset request to the system control unit leading to a system reset and/or to an application reset, an activation of a port emergency stop signal, a generation of a central processing unit reset request, and no reaction.

In various embodiments, the alarm handling circuitry may further include an alarm preprocessing circuit configured to provide the received alarm.

In various embodiments, the alarm handling circuitry may further include a further alarm processing circuit configured to process a further received alarm and to provide a further processed alarm response signal.

In various embodiments, the alarm handling circuitry may further include an interface between the alarm processing circuit and the further alarm processing circuit and configured to input an alive indication signal from the alarm processing circuit to the further alarm processing circuit indicating whether the alarm processing circuit is operating.

In various embodiments, the alive indication signal may be configured to be provided by the first monitoring circuit.

In various embodiments, the alarm handling circuitry may further include a third monitoring circuit configured to determine whether the further alarm processing circuit operates by processing the further received alarm and providing the further processed alarm response signal.

In various embodiments, the alarm handling circuitry may further include a further interface between the alarm processing circuit and the further alarm processing circuit configured to input a further alive indication signal from the further alarm processing circuit to the alarm processing circuit indicating whether the further alarm processing circuit is operating.

In various embodiments, the further alive indication signal may be configured to be provided by the third monitoring circuit.

In various embodiments, the third monitoring circuit may include a further alarm existence determination circuit configured to determine whether the further alarm has been received and configured to determine whether a further processed alarm response signal is provided, and a further response provision determination circuit configured to determine whether the further processed alarm response signal is provided in case it has been determined that the further alarm has been received and configured to determine whether the further alarm has been received in case it has been determined that the further processed alarm response signal has been provided.

In various embodiments, an absence of the alive indication signal may be a representation of the further received alarm.

In various embodiments, an absence of the further alive indication signal may be a representation of the received alarm.

In various embodiments, the alarm handling circuitry may further include a power supply configured to provide power to the alarm processing circuit, and a further power supply configured to provide power to the further alarm processing circuit.

In various embodiments, the further power supply may be independent of the power supply.

In various embodiments, the alarm handling circuitry may further include a first clock source configured to provide a clock signal to the first alarm processing circuit, and a second clock source configured to provide a further clock signal to the second alarm processing circuit.

In various embodiments, the second clock source may be independent of the first clock source.

In various embodiments, in a case of the received alarm being one of a power related alarm, a clock related alarm, and a temperature related alarm, the further received alarm is the same as the received alarm.

In various embodiments, the further processed alarm response signal may include at least one of a group of alarm response signals, the group including an activation of a fault signaling protocol and no reaction.

In various embodiments, a method of handling an alarm is provided. The method may include providing a processed alarm response signal by processing a received alarm using an alarm processing circuit, determining, using a first monitoring circuit, whether the alarm processing circuit operates by processing the received alarm and providing the processed alarm response signal, determining, using a second monitoring circuit, at least one of a plurality of different types of failure of the alarm processing circuit.

In various embodiments, the determining whether the alarm processing circuit operates may include determining whether an alarm has been received using an alarm existence determination circuit, and determining, using a response provision determination circuit, whether the processed alarm response signal is provided in case it has been determined that the alarm has been received.

In various embodiments, the determining at least one of a plurality of different types of failure of the alarm processing circuit may include providing a secondary processed alarm response signal by processing the received alarm using a secondary alarm processing circuit, and determining whether the secondary processed alarm response signal matches the processed alarm response signal using a response comparison circuit.

In various embodiments, the received alarm may be at least one alarm of a group of alarms, the group including a power related alarm, a clock related alarm, a temperature related alarm, an alarm from a lockstep comparator, an error correction related alarm, an interconnect related alarm, a register related alarm, an address related alarm, an input/output related alarm, and an alarm related to an exception state.

In various embodiments, the processed alarm response signal may include at least one of a group of alarm response signals, the group including
an activation of a fault signaling protocol, a generation of an interrupt request to a central processing unit, a generation of a non maskable interrupt request to a system control unit, a generation of a reset request to the system control unit leading to a system reset and/or to an application reset, an activation of a port emergency stop signal, a generation of a central processing unit reset request, and no reaction.

In various embodiments, the method may further include providing the received alarm by preprocessing an incoming alarm using an alarm preprocessing circuit.

In various embodiments, the method may further include providing a further processed alarm response signal by processing a further received alarm using a further alarm processing circuit.

In various embodiments, the method may further include transmitting an alive indication signal from the alarm processing circuit to the further alarm processing circuit indicating whether the alarm processing circuit is operating.

In various embodiments, the method may further include providing the alive indication signal using the first monitoring circuit.

In various embodiments, the method may further include determining, using a third monitoring circuit, whether the further alarm processing circuit operates by processing the further received alarm and providing the further processed alarm response signal, and providing a further alive indication signal.

In various embodiments, the method may further include transmitting the further alive indication signal, indicating whether the further alarm processing circuit is operating, from the further alarm processing circuit to the alarm processing circuit.

In various embodiments, the determining whether the further alarm processing circuit operates may include determining, using a further alarm existence determination circuit, whether the further alarm has been received, and determining, using a further response provision determination circuit, whether the further processed alarm response signal is provided in case it has been determined that the further alarm has been received.

In various embodiments, an absence of the alive indication signal may be a representation of the further received alarm.

In various embodiments, an absence of the further alive indication signal may be a representation of the received alarm.

In various embodiments, in a case of the received alarm being one of a power related alarm, a clock related alarm, and a temperature related alarm, the further received alarm may be the same as the received alarm.

In various embodiments, the further processed alarm response signal may include at least one of a group of alarm response signals, the group including an activation of a fault signaling protocol and no reaction.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

Various aspects of the disclosure are provided for devices, and various aspects of the disclosure are provided for methods. It will be understood that basic properties of the devices also hold for the methods and vice versa. Therefore, for sake of brevity, duplicate description of such properties may have been omitted.

What is claimed is:

1. An alarm handling circuitry, comprising:
   a first alarm processing circuit configured to process a first received alarm and to provide a first processed alarm response signal;

a second alarm processing circuit configured to process a second received alarm and to provide a second processed alarm response signal; and an interface between the first alarm processing circuit and the second alarm processing circuit configured to input an alive indication signal from the first alarm processing circuit to the second alarm processing circuit in a case of the first alarm processing circuit operating correctly, wherein an absence of the alive indication signal is a representation of the second received alarm.

2. The alarm handling circuitry of claim 1, the interface comprising:

an alarm existence determination circuit configured to determine whether the first alarm has been received and configured to determine whether the first processed alarm response signal is provided; and a response provision determination circuit configured to determine whether the first processed alarm response signal is provided in case it has been determined that the first alarm has been received and configured to determine whether the first alarm has been received in case it has been determined that the first processed alarm response signal has been provided.

3. The alarm handling circuitry of claim 2, wherein the alarm handling circuitry is configured to generate the alive indication signal using the alarm existence determination circuit in combination with the response provision determination circuit.

4. The alarm handling circuitry of claim 1, further comprising:

a further interface between the first alarm processing circuit and the second alarm processing circuit configured to input a further alive indication signal from the second alarm processing circuit to the first alarm processing circuit in a case of the second alarm processing circuit operating correctly.

5. The alarm handling circuitry of claim 4, wherein an absence of the further alive indication signal is a representation of the first received alarm.

6. The alarm handling circuitry of claim 1, further comprising:

a first power supply configured to provide power to the first alarm processing circuit; and a second power supply configured to provide power to the second alarm processing circuit.

7. A method of handling alarms, comprising:

providing a first processed alarm response signal by processing a first received alarm using a first alarm processing circuit;

providing a second processed alarm response signal by processing a second received alarm using a second alarm processing circuit;

transmitting an alive indication signal from the first alarm processing circuit to the second alarm processing circuit when the first alarm processing circuit is operating correctly, wherein an absence of the alive indication signal is a representation of the second received alarm.

8. The method of claim 7, further comprising:

generating the alive indication signal, comprising:

determining whether the first alarm has been received; and determining whether the first processed alarm response signal is provided in case it has been determined that the first alarm has been received.

9. An alarm handling circuitry, comprising:

an alarm processing circuit configured to process a received alarm and to provide a processed alarm response signal;

a first monitoring circuit configured to determine whether the alarm processing circuit operates by processing the received alarm and providing the processed alarm response signal; and a second monitoring circuit configured to determine at least one of a plurality of different types of failure of the alarm processing circuit, wherein the first monitoring circuit comprises:

an alarm existence determination circuit configured to determine whether the alarm has been received and configured to determine whether the processed alarm response signal is provided; and a response provision determination circuit configured to determine whether the processed alarm response signal is provided in case it has been determined that the alarm has been received and configured to determine whether the alarm has been received in case it has been determined that the processed alarm response signal has been provided;

wherein the first monitoring circuit is configured to determine that the alarm processing circuit operates if the alarm has been received and the processed alarm response signal is provided and to determine that the alarm processing circuit does not operate if the alarm has been received and the processed alarm response signal is not provided, or if the processed alarm response signal is provided, even though the alarm has not been received.

10. The alarm handling circuitry of claim 9, wherein the second monitoring circuit comprises:

a secondary alarm processing circuit configured to process the received alarm and to provide a secondary processed alarm response signal; and a response comparison circuit configured to determine whether the secondary processed alarm response signal matches the processed alarm response signal.

11. The alarm handling circuitry of claim 9, further comprising:

an alarm preprocessing circuit configured to provide the received alarm.

12. The alarm handling circuitry of claim 9, further comprising:

a further alarm processing circuit configured to process a further received alarm and to provide a further processed alarm response signal.

13. The alarm handling circuitry of claim 12, further comprising:

an interface between the alarm processing circuit and the further alarm processing circuit and configured to input an alive indication signal from the alarm processing circuit to the further alarm processing circuit indicating whether the alarm processing circuit is operating.

14. The alarm handling circuitry of claim 12, further comprising:

a power supply configured to provide power to the alarm processing circuit; and a further power supply configured to provide power to the further alarm processing circuit.

15. A method of handling an alarm, comprising:

providing a processed alarm response signal by processing a received alarm using an alarm processing circuit;

determining, using a first monitoring circuit, whether the alarm processing circuit operates by processing the received alarm and providing the processed alarm response signal;

determining, using a second monitoring circuit, at least one of a plurality of different types of failure of the alarm processing circuit, wherein the determining whether the alarm processing circuit operates comprises:

determining whether the alarm has been received using an alarm existence determination circuit;

determining, using a response provision determination circuit, whether the processed alarm response signal is provided in case it has been determined that the alarm has been received and whether the alarm has been received in case it has been determined that the processed alarm response signal has been provided; and wherein the first monitoring circuit is configured to determine that the alarm processing circuit operates if the alarm has been received and the processed alarm response signal is provided and to determine that the alarm processing circuit does not operate if the alarm has been received and the processed alarm response signal is not provided, or if the processed alarm response signal is provided, even though the alarm has not been received.

16. The method of claim 15, wherein the determining at least one of a plurality of different types of failure of the alarm processing circuit comprises:

providing a secondary processed alarm response signal by processing the received alarm using a secondary alarm processing circuit; and determining whether the secondary processed alarm response signal matches the processed alarm response signal using a response comparison circuit.

17. The method of claim 15, further comprising:

providing the received alarm by preprocessing an incoming alarm using an alarm preprocessing circuit.

18. The method of claim 15, further comprising:

providing a further processed alarm response signal by processing a further received alarm using a further alarm processing circuit.

19. The method of claim 18, further comprising:

transmitting an alive indication signal from the alarm processing circuit to the further alarm processing circuit indicating whether the alarm processing circuit is operating.

20. The method of claim 19, further comprising:

providing the alive indication signal using the first monitoring circuit.

* * * * *